United States Patent [19]

Burke

[11] Patent Number: 4,914,726
[45] Date of Patent: Apr. 3, 1990

[54] MASS VELOCITY CONTROLLER

[75] Inventor: Edward F. Burke, Lake Oswego, Oreg.

[73] Assignee: Tektronix, Inc., Beaverton, Oreg.

[21] Appl. No.: 297,202

[22] Filed: Jan. 17, 1989

[51] Int. Cl.$^4$ .............................................. G05D 15/00
[52] U.S. Cl. ................................... 318/646; 318/615; 318/561; 318/618; 400/322
[58] Field of Search ............... 318/646, 615, 561, 618, 318/685, 611; 400/322

[56] References Cited

U.S. PATENT DOCUMENTS

| | | | |
|---|---|---|---|
| 4,213,714 | 7/1980 | Jones et al. ...................... | 400/322 X |
| 4,331,910 | 5/1982 | Kohzai et al. ........................ | 318/618 |
| 4,481,453 | 11/1984 | Welburn ............................... | 318/696 |
| 4,535,277 | 8/1985 | Kurakake ............................ | 318/561 |
| 4,636,700 | 1/1987 | Moore et al. ........................ | 318/611 |
| 4,816,734 | 3/1989 | Kurakake et al. .................. | 318/615 |

Primary Examiner—William M. Shoop, Jr.
Assistant Examiner—Saul M. Bergmann
Attorney, Agent, or Firm—Robert S. Hulse; Edward B. Anderson

[57] ABSTRACT

A control topology for a servo motor carriage drive includes a strain gauge coupling the carriage to a motor-driven belt to provide a signal representative of the flexure of the belt. A velocity signal is taken from a linear encoder on the carriage. These signals are used in inner and outer feedback loops for controlling the velocity of the carriage as it travels along a predetermined path.

14 Claims, 5 Drawing Sheets

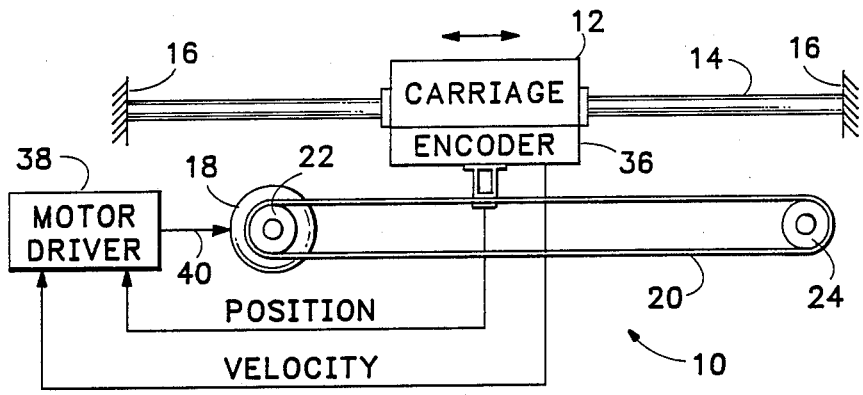
FIG.1
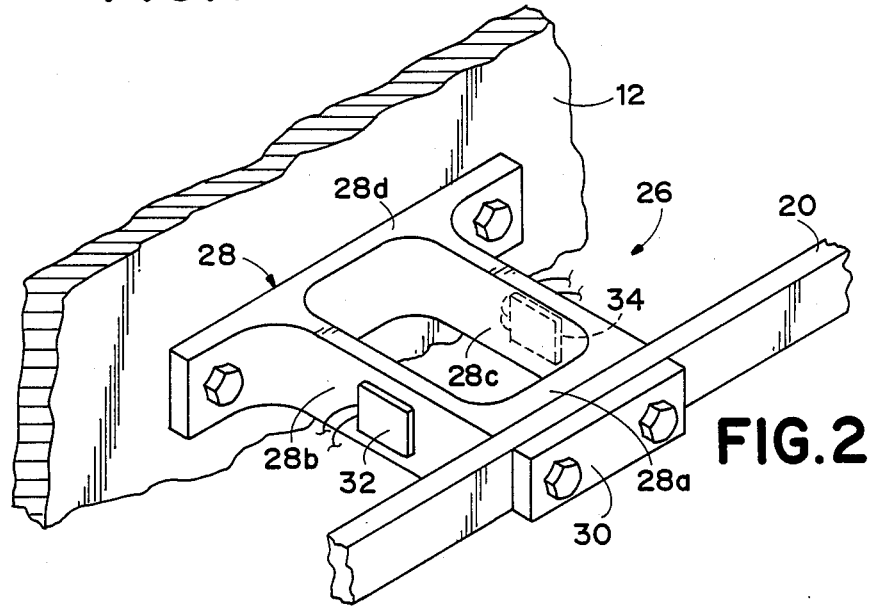
FIG.2
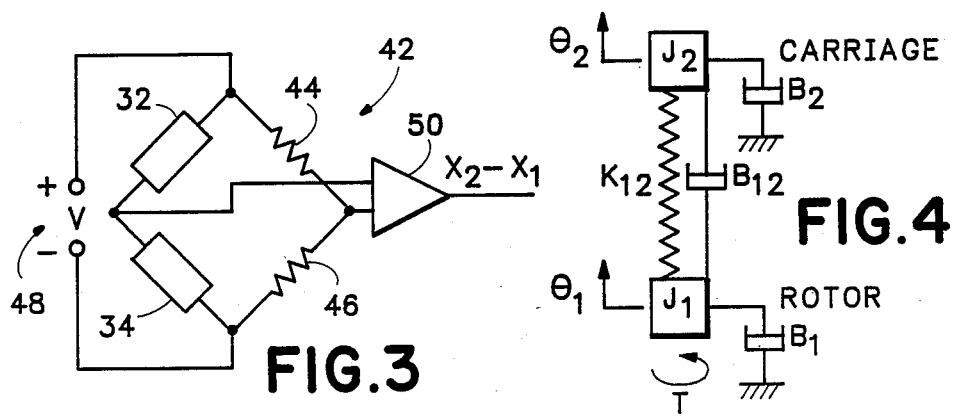
FIG.3
FIG.4

MASS VELOCITY CONTROLLER

FIELD OF THE INVENTION

This invention relates to a motor-driven mass-moving control system, and more particularly to such a system for controlling the motor operation in response to movement or position of the mass.

BACKGROUND OF THE INVENTION

The preferred embodiment of this invention is related to motion control of an object, such as a shuttle carriage of an ink jet printer. However, it is generally applicable to multiphase motors which drive a mass.

In order to obtain accuracy, such as during a printing operation when typically 300 dots per inch are applied to a paper on which an image is being printed, velocity of the printer carriage must be closely controlled. Typically, a desired velocity profile has acceleration and deceleration ramps at the ends of a target, and a generally constant velocity. This velocity profile is fed directly to the motor during the scan over the paper. However, the motor and the carriage-drive apparatus are not absolutely rigid. A carriage is typically driven with a cable and pulley system or a cogged timing belt. Since the timing belt or cable have limited stiffness, the actual velocity profile of the carriage is not perfectly constant. Rather, it has undesirable ripple which causes print defects.

The cable or belt is thus analogous to a spring with a dashpot and the carriage is the mass. However, as it turns out in the spring analogy, the spring and dashpot are not anchored to a fixed base. Instead, they are attached to the rotor of the motor which is driven by the motor drive current. The result is that the spring, which is representative of the cable or belt, is attached to a mass represented by the rotor. The rotor is then fixed to a base through an electromagnetic connection between the motor stator and rotor, as a function of the motor current. The electromagnetic connection may also be represented by a second spring. Most of the ripple in the carriage is due to variations between the actual motor movement and the ideal or input motor movement defined by the motor current.

In a printer, a servo motor is often used to translate the carriage back and forth across a frame. Typically, a speed servo loop is formed around the motor with an encoder or tachometer used to provide a speed signal. A disadvantage of this approach is that the mass/spring combination formed by the heavy carriage and the elastic cable or belt are outside the loop, so the actual point of use is uncontrolled.

It is therefore desirable to place the control loop around the carriage so that the actual point of use is controlled. However, this is not easily done, since the mass/spring resonant system formed by the cable or belt and carriage make loop compensation very difficult.

SUMMARY OF THE INVENTION

The present invention provides a stable, high performance system for controlling carriage or mass velocity directly.

More particularly, one aspect of the present invention provides a system for controlling the movement of a mass by a motor-driven flexible element comprising a mass movable along a predetermined path, a flexible element coupled to the mass, means for generating a target velocity signal representing a predetermined velocity profile for the mass, and a motor responsive to the target velocity signal and having a rotor coupled to the flexible element for moving the mass along the path. A first sensor senses a physical characteristic representative of the variation in length of the flexible member extending between the motor and the mass. A feedback circuit is responsive to the sensed physical characteristic for adjusting the target velocity signal in a manner reducing the variation between the target and actual velocities of the mass.

In the preferred embodiment, this is provided by a carriage driver system having a carriage movable along a predetermined path. A belt couples the rotor of a motor to the carriage for moving the carriage along a path according to a target velocity signal. A flexible coupling member couples the belt to the carriage and has a load cell for sensing the flexure of the coupling member. This flexure is representative of the load or force on the belt, the distortion, such as stretching of which is proportional to its load. The sensed flexure by the load cell thus provides a first feedback signal representative of the distortion of the connecting cable or belt. This signal is used to adjust the target velocity signal in a manner reducing the belt distortion.

Also, in the preferred embodiment, the velocity of the carriage, as determined by a linear encoder, generates a signal of the actual carriage velocity. This signal is also fed back in an outer servo loop for adjustment of the target velocity signal in a manner reducing the variation of the actual velocity from the target velocity.

Inner and outer servo loops are thus generated which provide a very stable and effective means for controlling the actual velocity of the carriage relative to a desired target velocity profile during shuttle back and forth along the predetermined path.

These and other features and advantages of the present invention will become apparent from a reading of the detailed description with reference to the following accompanying drawings.

BRIEF DESCRIPTION OF THE DRAWINGS

Fig. 1 is a general block diagram showing the preferred embodiment made according to the present invention.

FIG. 2 is a fragmentary diagram illustrating a load cell used in the system of FIG. 1 for joining the belt to the carriage.

FIG. 3 is a simplified diagram of the bridge circuit providing sensing using the load cell of Fig. 2.

FIG. 4 is a diagram illustrating the spring/mass equivalence of the system of FIG. 1.

DETAILED DESCRIPTION OF THE PREFERRED EMBODIMENT

Figure 5:
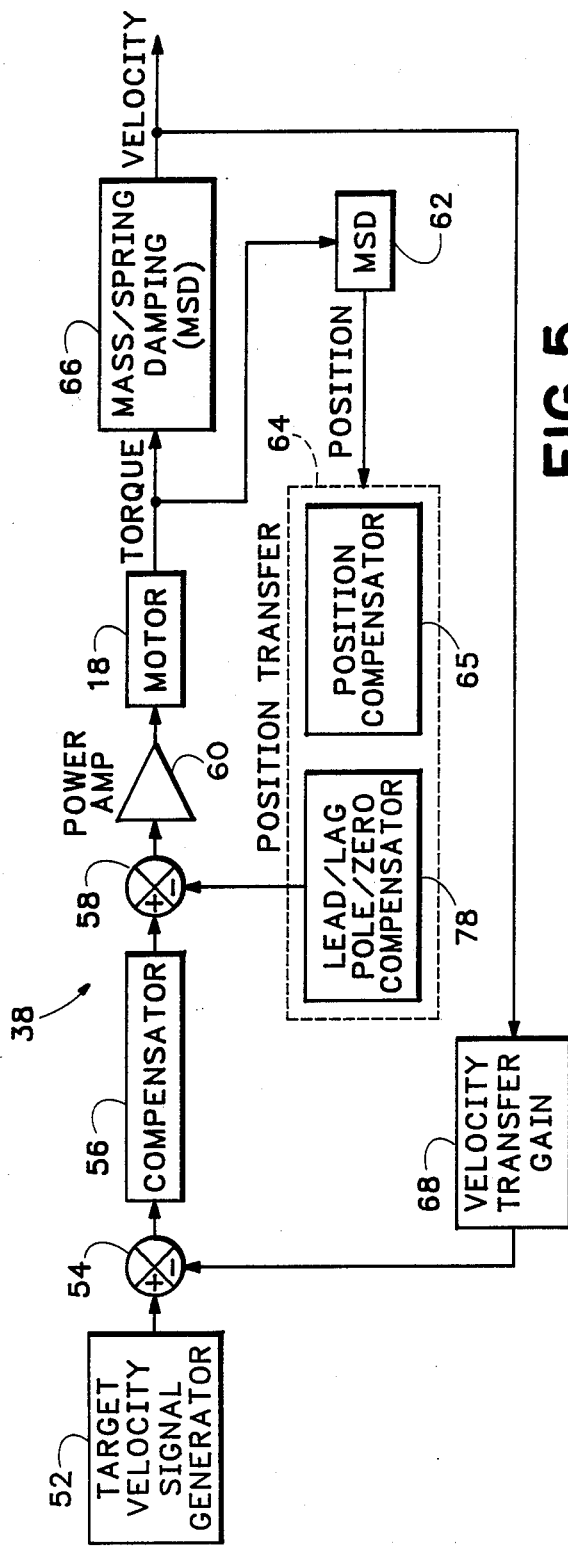
FIG. 5 is a general block diagram illustrating the loop topology for the system of FIG. 1.

Referring initially to FIG. 1, a system 10 made according to the invention for controlling the velocity of movement of a carriage 12 along a path defined by a bar 14 is shown. Bar 14 is mounted relative to a frame represented at mounting 16. A DC motor 18 drives a continuous timing belt 20 extending around a motor pulley 22 and an idler pulley 24. Belt 20 is coupled to carriage 12 via a coupling member 26 shown in more detail in FIG. 2.

Coupling member 26 comprises a mounting bracket 28 having an internal opening, as shown. A clamp end 28a is fixedly attached to belt 20 by a clamping plate 30 and appropriate mounting means for fixedly holding the clamping plate on end 28a. From opposite ends of end 28a are elongate flexible arms 28b and 28c. These arms extend to a carriage-mounting end 28d having flared flanges which are fixedly attached to carriage 12, as shown.

Mounted to the flexible arms 28b and 28c are strain gauges 32 and 34. The strain gauges may be such as those sold under the proprietary name of Transducer-Class ™ strain gauges having model number EA-13-T043p-1OC sold by Measurements Group, Inc. of Raleigh, N.C. Mounting bracket 28 is preferably made of 7075 T6 extruded aluminum and has a width across end 28a of approximately 0.7 inches and the arms having a length of ½ inch in the uniform thickness region. It will be understood by those skilled in the art that other strain gauges and forms of making coupling member 26 are readily realizable. For instance, four strain gauges could be used with the additional two being mounted to the inside surfaces of arms 28b and 28c.

Referring again to FIG. 1, carriage 12 also has an optical encoder 36 mounted on it which reads a linear encoding strip mounted fixedly relative to bar 14 which is sensed as the carriage moves back and forth along bar 14. The pulse train generated by the encoder is proportional to the velocity of the carriage. The pulse train is converted in a frequency-to-voltage converter into an analog signal. This signal is fed through a loop filter, as will be described to produce an analog speed signal. This signal along with what is referred to as a position signal generated by strain gauges 32 and 34 are processed in a motor driver circuit 36. A target velocity signal is output by driver 38 on a conductor 40 for input into motor 18 for controlling the velocity of carriage 12 as it shuttles back and forth on bar 14.

A representative strain gauge bridge network 42 is illustrated generally in FIG. 3. The two strain gauges 32 and 34 are connected in a bridge formation along with resistors 44 and 46 which is driven by a reference voltage source 48. The strain gauges are connected as shown so that for flexing of arms 28b and 28c in line with belt 20 during movement of carriage 12, one gauge senses a force due to compression and the other a force due to tension. In the reverse direction, each strain gauge senses the opposite form of force. The two strain gauges thus, when strained, produce a differential voltage which is fed into a differential amplifier 50. The amplifier produces an output signal representative of the load on the strain gauges. As will be seen, this load is also directly proportional to the elongation of belt 20 between pulley 22 and carriage 12. In other words, the shift in position of the carriage relative to the rotor due to belt distortion is sensed.

Prior to making a physical prototype of the preferred embodiment, the mass/spring dynamics and compensation of the proposed system were modeled and simulated on a computer system having the proprietary name LSAP ™ available from California Scientific Software. The following summarizes the model development.

Motor 18 in the preferred embodiment is made by VDO and has a model number M48X25. Pulley 22 has 32 teeth at 0.08 pitch. Timing belt 20 has 535 teeth with the axes of the idler and motor pulleys being 20.12 inches apart. The AE constant for the belt was experimentally measured to be $1.069 \times 10^4$ LB. The effective stiffness deployed on the pulleys is $K_{TOT} = 1.332 \times 10^3$ LB-IN. This results in a fundamental frequency for the belt pulley combination of $f_N = 80$ Hz. In rotary coordinates, the stiffness coefficient is $K_\theta = K_{TOT} \times R^2 = 221.1$ LB-IN/Radian.

A damping coefficient was determined on the basis that force is proportional to velocity on the strain gauge and inversely proportional to the length of the belt, or $F = c'x/L$. This results in $c' = 2.9948$ LB-SEC/IN. A total damping coefficient $c_{TOT} = 3.3732 \times 10^{31}$ $^1$LB-SEC/IN. In rotary coordinate units, $c_\theta = 6.19 \times 10^{31}$ $^2$LB-IN-SEC/RAD = $B_{12}$. FIG. 4 illustrates the spring/mass model of the system of FIG. 1. As has been described, FIG. 1 shows the relationship between motor 18, pulleys 22 and 24, and carriage 12. The motor rotor rotation drives carriage 12 linearly along bar 14 via belt 20. As will be seen, rotary coordinate units are used in the following discussion. The motor rotor is represented by the variables having a subscript 1 and the carriage is represented by the variables having a subscript 2. The rotor has a torque T and mass moment of inertia and the rotary position of the rotor is represented by $\theta_1$. The carriage has a calculated mass moment of inertia $j_1$ and has a rotary position represented by $\theta_2$. Theoretical dashpots $B_1$ and $B_2$ have effective positions between the frame and the rotor and carriage, respectively.

The belt is represented by a spring having a coefficient $K_{12}$ and a dashpot having a coefficient $B_{12}$. The two equations of rotary motion for this are:

$$J_1\theta_1 = -K_{12}(\theta_1 - \theta_2) - B_{12}(\theta_1 - \theta_2) - B_1(\theta_1) + T$$

$$J_2\theta_2 = K_{12}(\theta_1 - \theta_2) + B_{12}(\theta_1 - \theta_2) - B_2(\theta_2)$$
$$= K12(81-82) +- B z,$$ These equations, when transform to the Laplace domain and rearranged are:

$$[J_1 s^2 + (B_{12} + B_1)s + K_{12}]\theta_1 - (B_{12}s + K_{12})\theta_2 = T -$$

$$(B_{12}s + K_{12})\theta_1 + [J_2 s^2 + (B_{12} + B_2)s + K_{12}]\theta_2 = 0$$

These can be considered to be two equations in two unknowns ($\theta_1$ and $\theta_2$). Solving these equations for the position of the motor rotor ($\theta_1$) and the position of the carriage mass ($\theta_2$) as Laplace polynomials results in the following:

$$\frac{\theta_1}{T(s)} = \frac{N_{12}s^2 + N_{11}s + N_{10}}{s^4 + D_3 s^3 + D_2 s^2 + D_1 s}$$

$$\frac{\theta_2}{T(s)} = \frac{N_{21}s + N_{20}}{s^4 + D_3 s^3 + D_2 s^2 + D_1 s}$$

$$\frac{\theta_2 - \theta_1}{T(s)} = \frac{-N_{12}s + (N_{21} - N_{11})}{s^3 + D_3 s^2 + D_2 s + D11}$$

$$\frac{\theta_2}{T(s)} = \frac{N_{21}s + N_{20}}{s^3 + D_3 s^2 + D_2 s + D_1}$$

Where:

$$N_{12} = \frac{1}{J_1} \qquad N_{20} = \frac{K_{12}}{J_1 J_2}$$

$$N_{11} = \frac{B_{12} + B_2}{J_1 J_2} \qquad N_{10} = \frac{K_{12}}{J_1 J_2}$$

$$D_3 = \frac{B_1 + B_{12}}{J_1} + \frac{B_2 + B_{12}}{J_2}$$

$$D_2 = \frac{K_{12}(J_1 + J_2) + B_{12}B_2 + B_{12}B_1 + B_1 B_2}{J_1 J_2}$$

$$N_{21} = \frac{B_{12}}{J_1 J_2} \qquad D_1 = \frac{K_{12}(B_1 + B_2)}{J_1 J_2}$$

The values for these variables are as follows:

$$B_1 = 1.97 \times 10^{-4} \frac{\text{LB-IN-SEC}}{\text{RAD}}$$

$$B_{12} = 6.19 \times 10^{-2} \frac{\text{LB-IN-SEC}}{\text{RAD}}$$

$$B_2 = 5.029 \times 10^{-4} \frac{\text{LB-IN-SEC}}{\text{RAD}}$$

$$B_2 = 5.029 \times 10^{-4} \frac{\text{LB-IN-SEC}}{\text{RAD}} \quad (.1 \text{ LB @ 33 IPS})$$

$$J_1 = 1.459 \times 10^{-4} \text{ LB-IN-SEC}^2$$

$$J_2 = 8.60 \times 10^{-4} \text{ LB-IN-SEC}^2$$

$$K_{12} = 221.1 \frac{\text{LB-IN}}{\text{RAD}}$$

FIG. 5 shows a block diagram of a generalized form of a control system 10 shown in Fig. 1 based on the transfer function concept just presented. The transfer functions for $(\theta_2 - \theta_1)/T(s)$ and $(\theta_2/T(s))$ provide a model of the mass spring damping of the physical operating system. Motor driver 38 includes a generator 52 which feeds a target velocity signal through a signal combiner 54, a compensator 56, and another signal combiner 58. The signal from combiner 58 passes through a power amplifier 60 which processes the signal for driving motor 18. The output of motor 18 is the torque applied to belt 20. This torque acts through the mass spring damping effects of the motor and belt as represented by block 62. The result is a position signal which is fed through a position transfer block 64 comprising a position compensator 65 and a lead/lag or pole/zero compensator 78 after which it is combined with the target velocity signal at signal combiner 58. This position feedback signal offsets the target velocity signal to reduce the variation of the position of the carriage from the desired actual position during motion.

The torque from the motor also works through the mass/spring damping effects shown at block 66 for generating the carriage velocity which is input through a velocity transfer gain circuit 68. An appropriate compensating signal is thereby generated and fed into signal combiner 54 for adjusting the level of the target velocity signal for reducing the variation of the actual velocity from the target velocity. The effect of both the inner and outer servo loops provides for a very stable operating system which provides control directly through the carriage.

Figure 6:
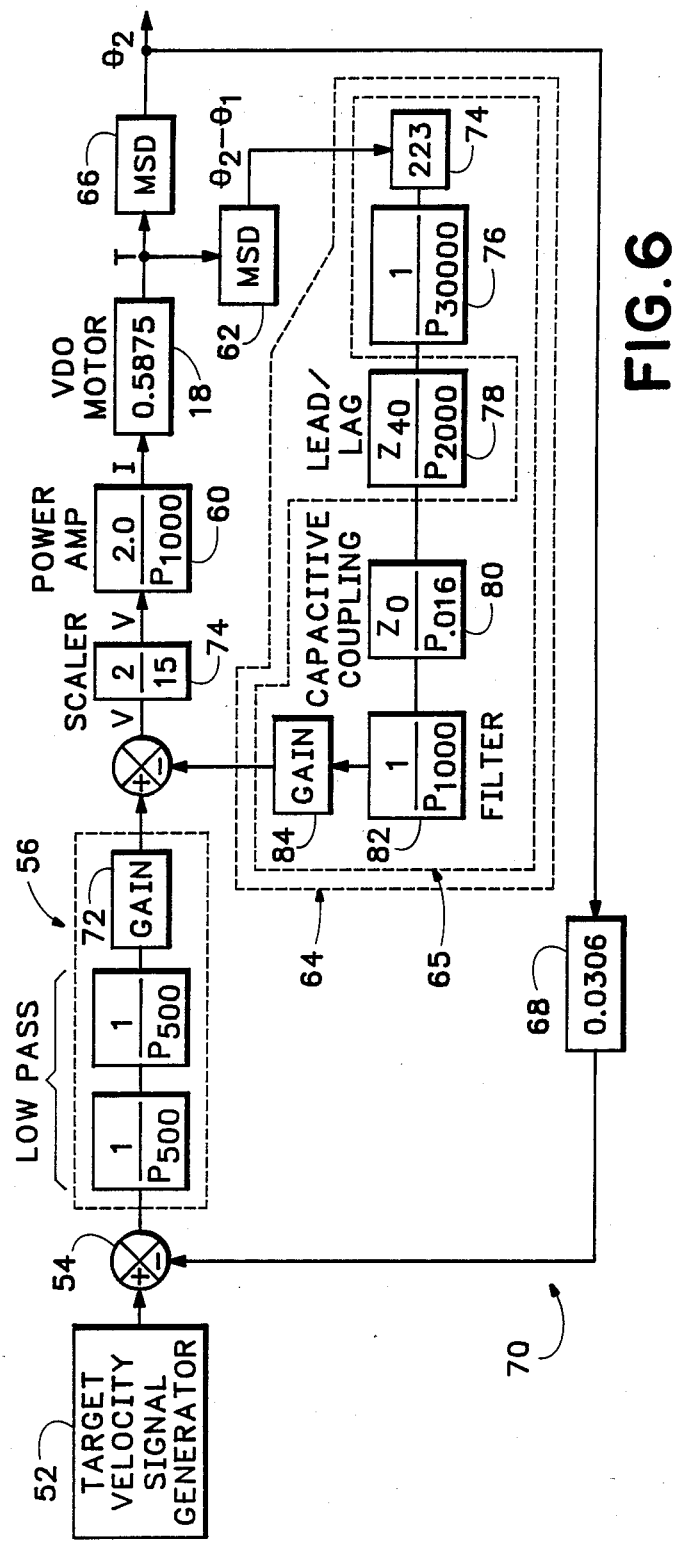
FIG. 6 is a detailed block diagram showing the loop topology of the system of FIG. 5.

The transfer equations previously discussed are used to generate the actual control system 70 shown in FIG. 6. The portions which are the same as those shown in FIG. 5 are given the same reference numerals. Compensator 56 comprises two lowpass filters having poles at 500 Hz and a gain block 72 scaled to correspond to the overall loop gain desired. This is preferably set at 50 for the system shown. A scaler gain of 2/15 as shown in block 74, adjusts the target velocity signal for input into power amp 60. The power amp has a gain factor of 2 and a pole at 1000 Hz (shown as P1000). The motor used has a torque factor of 0.5875. The velocity transfer gain shown in box 68 has a scale factor of 0.0306.

The inner servo loop applies a strain gauge sensitivity factor of 223 at block 74. An amplifier pole at 30,000 Hz (P30,000) is represented by filter 76. A lead/lag block or pole/zero compensator 78 provides a circuit having a zero at 40 Hz ($Z_{HO}$) and a pole at 2000 Hz (P2000) to compensate for the strain gauges. Capacitive coupling represented by block 80 has a zero at 0 Hz ($Z_o$) and a pole at 0.016)P0.016). A 1000 Hz (P1000) lowpass filter 82 is then coupled to the inner loop gain 84 which is preferably set at 10. The transfer functions are effected in this system by the mass/spring damping provided as discussed.

Figure 7:
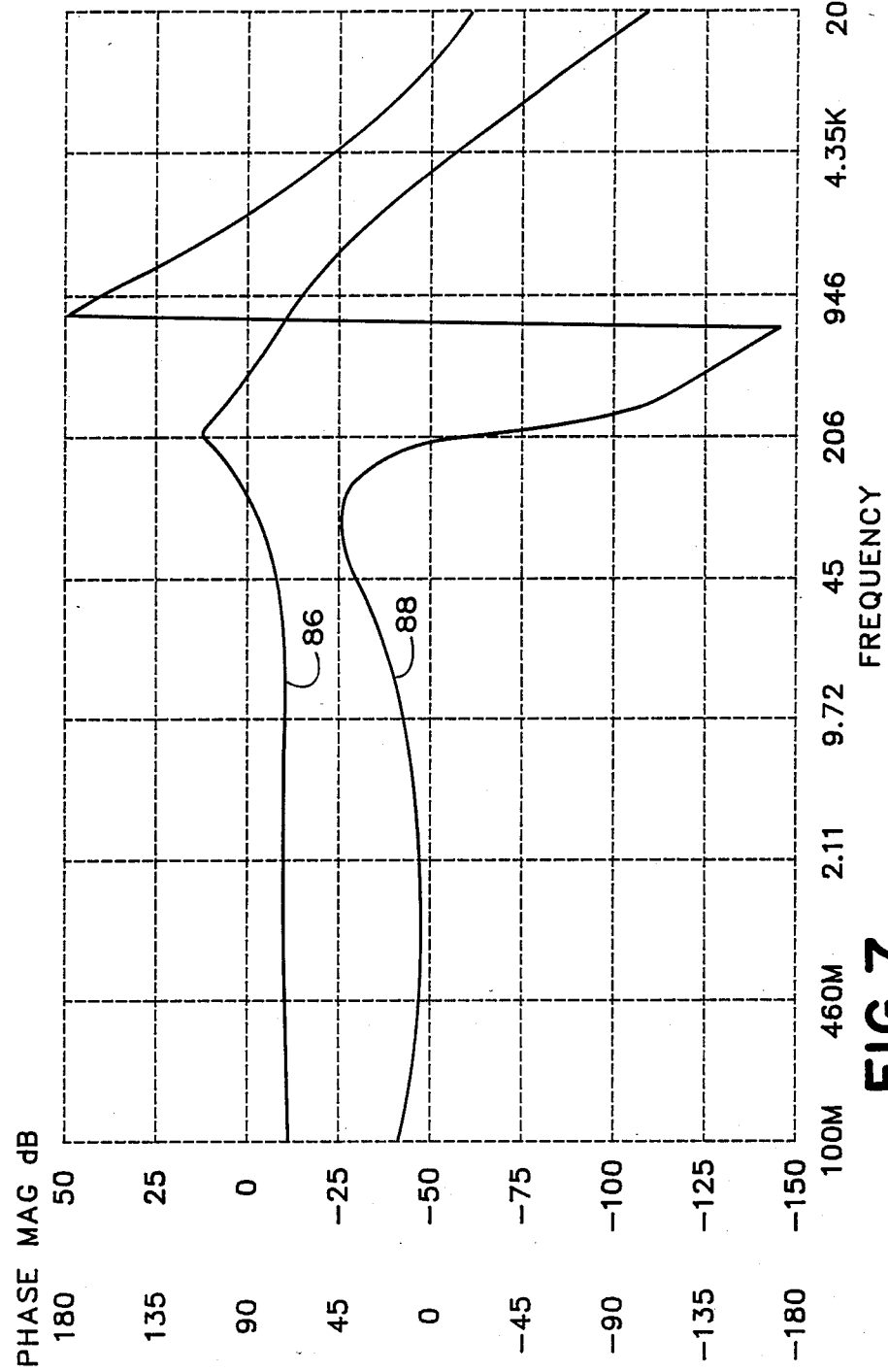
FIGS. 7, 8 and 9 are Bode plots illustrating expected operation of the system of FIG. 6 without the outer control loop, without the inner control loop, and with the full system, respectively.
Figure 8:
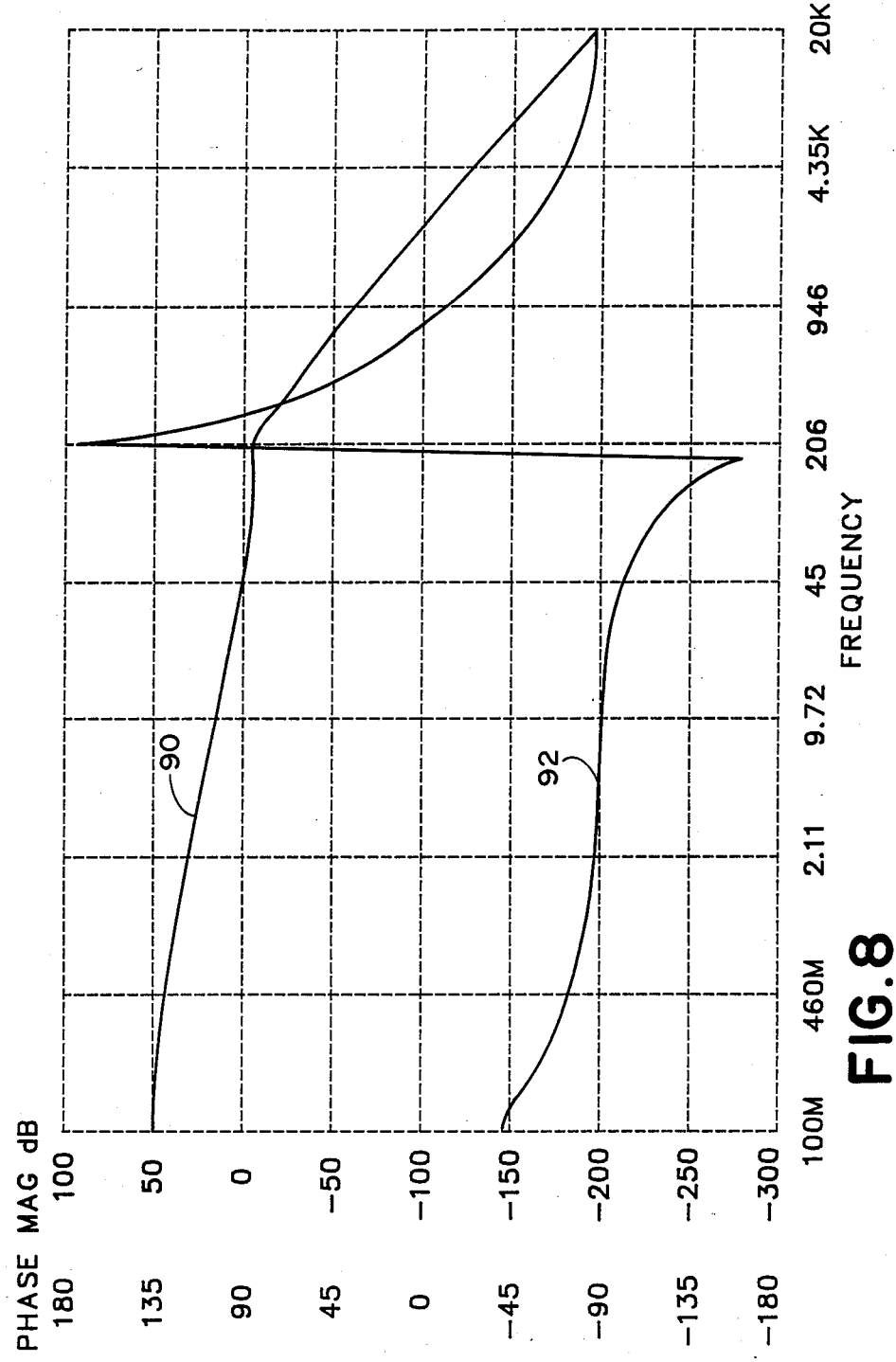
Figure 9:
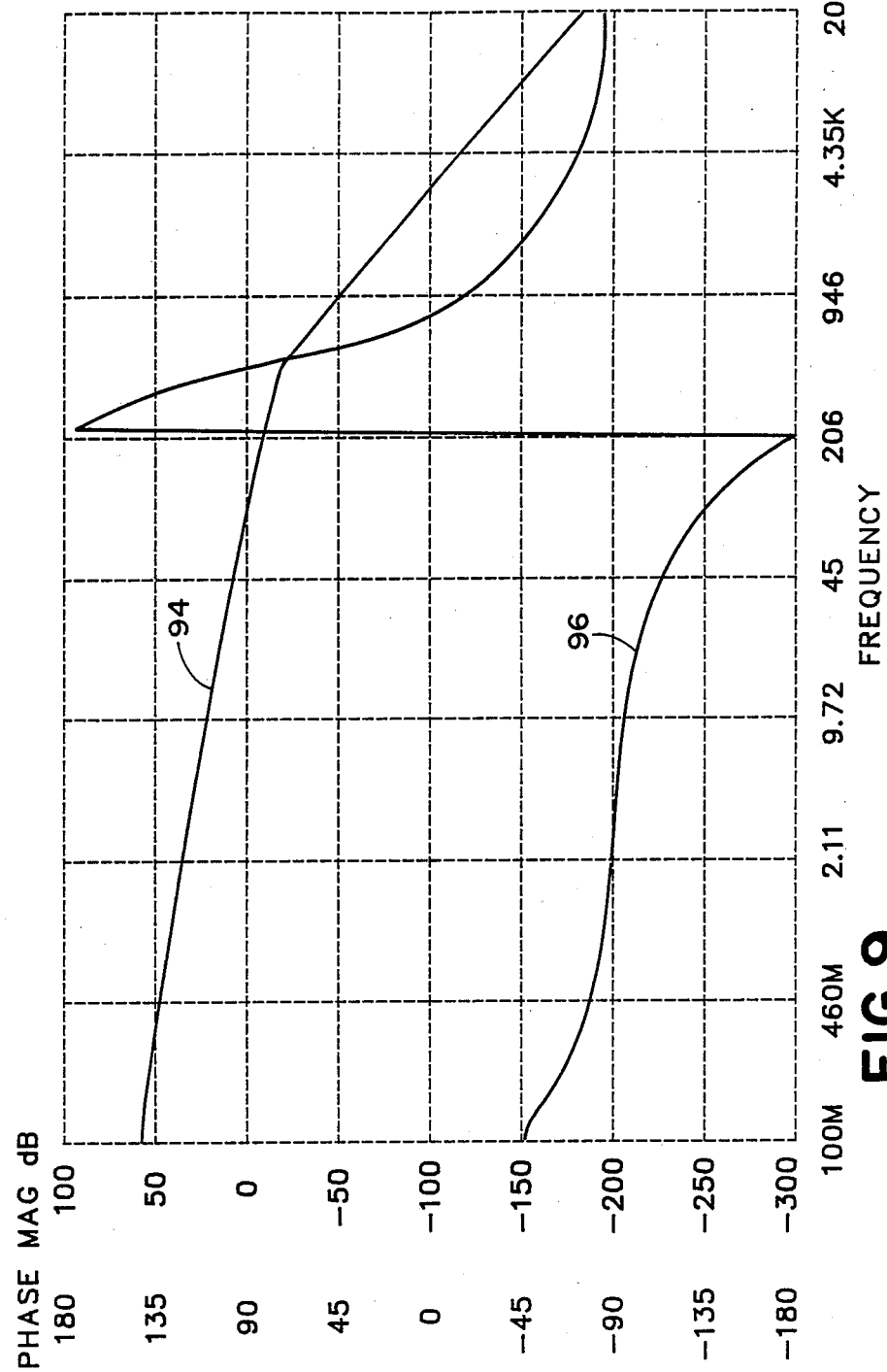

FIGS. 7, 8 and 9 illustrate various operating characteristics of this control system as provided by a computer simulation using the transfer functions to model the mass/spring damping dynamics. FIG. 7 shows the Bode plot for the control system with the outer loop disabled. A resonant peak is shown to exist on magnitude curve 86 at just past 206 Hz and there is zero dB gain at $-135°$ phase shift or 45° phase margin as illustrated on phase curve 88.

FIG. 8 shows the control system with the inner loop disabled, thereby using only the velocity feedback signal. The magnitude and phase are shown by curves 90 and 92, respectively. This Bode plot shows an undesirable resonant peak which forces the 0 dB line (unity gain) to only 45 Hz.

The total control system operation is represented by the Bode plot shown in FIG. 9. Here it is clear that there is no resonant frequency peak in magnitude curve and there is the desired zero dB gain at $-135°$ phase shift and approximately 150 Hz, identified by phase curve 96.

The system of FIG. 6 has been reduced to practice and found to perform substantially as expected. This system can therefore be seen to be very stable and effective in controlling operation of the motor and carriage to obtain the desired velocity travel characteristics of the carriage. It will be appreciated that such a control system can be developed for any motor-driven mass where the velocity of the mass travelling along a predetermined path must be controlled. Further, although a load cell formed of a strain gauge and associated coupling member were used to determine the positional change of the mass due to the flexure of the belt or cable, other devices may also be used to provide a signal representative of the cable flexure.

Thus, although the invention has been described with reference to the foregoing preferred embodiment, it will be apparent to those skilled in the art that variations and changes may be made without varying from the spirit and scope of the invention as defined in the claims.

I claim:

1. A system for controlling the movement of a mass by a motor-driven flexible element means comprising:
a mass moveable along a predetermined path;
flexible element means coupled to the mass;

means for generating a target velocity signal following a predetermined velocity profile for the motor corresponding to a target velocity profile of the mass along the predetermined path;

motor means responsive to the target velocity signal and having a rotor coupled to the flexible element means for moving the mass along the path by applying force to the mass through a length of the flexible element means extending between the motor means and the mass;

first sensing means for sensing a physical characteristic representative of the variation in length of the flexible element means extending between the motor means and the mass; and first feedback means posed between the generating means and the motor means, and responsive to the sensed physical characteristic for adjusting the target velocity signal in a manner reducing the variation in the length of the flexible element means.

2. A system according to claim 1 wherein the first sensing means senses the force applying by the flexible element means on the mass.

3. A system according to claim 2 wherein the first sensing means comprises a flexible coupling member coupling the flexible element to the mass and means for sensing the flexure of the coupling member.

4. A system according to claim 3 wherein the coupling member comprises an arm fixed at opposite ends to and extending between the mass and the flexible element means, and the flexure sensing means comprises strain gauge means attached to the arm.

5. A system according to claim 4 wherein the coupling member comprises a second arm also fixed at opposite ends to and extending between the mass and the flexible element means and spaced from the first arm such that the ends of the arms are fixed distances apart, and a second strain gauge means attached to the second arm, with the two strain gauges positioned on the respective arms to sense compression and tension respectively and alternatively for different directions of force exerted on the mass.

6. A system according to claim 1 wherein the first feedback means converts the sensed variation in flexible element means length into a signal representative of an adjustment in the torque of the motor to offset the variation in flexible element means length.

7. A system according to claim 1 further comprising second sensing means for sensing a physical characteristic representative of the actual velocity of the mass, and second feedback means coupled to the second sensing means for adjusting the target velocity signal in a manner offsetting the variation of the actual velocity from the target velocity of the mass.

8. A system according to claim 6 wherein the second feedback means adjusts the target velocity signal prior to the adjustment of the target velocity signal by the first feedback means.

9. A system for controlling the movement of a mass by a motor-driven flexible element means comprising:
a mass movable along a predetermined path;
flexible element means coupled to the mass;
means for generating a target velocity signal following a predetermined velocity profile for the motor;
motor means responsive to the target velocity signal and having a rotor coupled to the flexible element means for moving the mass along the path;
a flexible coupling member coupling the flexible element means to the mass;
means for sensing the flexure of the coupling member;
first feedback means posed between the generating means and the motor means, and responsive to the sensed flexure of the coupling member for adjusting the target velocity signal in a manner reducing the flexure of the coupling member;
second sensing means for sensing the actual velocity of the mass; and
second feedback means coupled to the second sensing means for adjusting the target velocity signal prior to the adjustment of the target velocity signal by the first feedback means, in a manner offsetting the variation of the actual velocity from the target velocity of the mass.

10. A system for controlling the movement of a mass along a predetermined path by a motor-driven element comprising:
means for generating a target velocity signal;
motor means responsive to the target velocity signal for rotating a rotor;
means drivingly coupling the motor and the mass for moving the mass along the path;
a coupling member joining the coupling means to the mass;
sensing means coupled to the coupling member for sensing the force applied by the coupling means on the mass; on
feedback means responsive to the sensed force for adjusting the target velocity signal is a manner reducing the variation between the actual and target velocities of the mass.

11. A system according to claim 10 wherein the coupling member is flexible and the sensing means senses the flexure of the coupling member.

12. A system according to claim 11 wherein the coupling member comprises an arm fixed at opposite ends to and extending between the mass and the coupling means and the flexure sensing means comprises strain gauge means attached to the arm.

13. A system according to claim 12 wherein the coupling member comprises a second arm also fixed at opposite ends to and extending between the mass and the coupling means and spaced from the first arm such that the ends of the arms are fixed distances apart, and a second strain gauge means attached to the second arm, with the two strain gauges positioned on the respective arms to sense compression and tension respectively and alternatively for different directions of force exerted on the mass.

14. A system according to claim 13 where in the coupling means is a flexible member and the strain gauges generate a signal representative of the flexure of the flexible member.

* * * * *

UNITED STATES PATENT AND TRADEMARK OFFICE
CERTIFICATE OF CORRECTION

PATENT NO. : 4,914,726

DATED : April 3, 1990

INVENTOR(S) : Edward F. Burke

Page 1 of 2

It is certified that error appears in the above-identified patent and that said Letters Patent is hereby corrected as shown below:

Col. 3, line 58, change "elongation" to --distortion--.

Col. 4, line 29, following "inertia" insert --$J_1$--; line 31, change "$j_1$" to --$J_2$--; lines 39-43, delete and replace with --

$$J_1\ddot{\Theta}_1 = -K_{12}(\Theta_1-\Theta_2) - B_{12}(\dot{\Theta}_1-\dot{\Theta}_2) - B_1(\dot{\Theta}_1) + T$$

$$J_2\ddot{\Theta}_2 = K_{12}(\Theta_1-\Theta_2) + B_{12}(\dot{\Theta}_1-\dot{\Theta}_2) - B_2(\dot{\Theta}_2)$$

These equations, when transformed to Laplace domain and rearranged are:--.

Col. 4, line 65, change "$\Theta_2$" to --$\dot{\Theta}_2$--.

Col. 5, line 36, delete and replace with --functions for $(\Theta_2-\Theta_1)/T_{(S)}$ and $\dot{\Theta}_2/T_{(S)}$ provide a model--.

Col. 6, line 7, change "P1000)" to --$P_{1000}$)--; line 12, change "(P30,000)is" to --($P_{30,000}$) is--; line 14, change "$Z_{HO}$" to --$Z_{40}$-- and change "(P2000)" to --($P_{2000}$)--; line 17, change "0.016)P0.016)" to --0.016 ($P_{0.016}$)--;

UNITED STATES PATENT AND TRADEMARK OFFICE
CERTIFICATE OF CORRECTION

PATENT NO. : 4,914,726

DATED : April 3, 1990

INVENTOR(S) : Edward F. Burke

It is certified that error appears in the above-identified patent and that said Letters Patent is hereby corrected as shown below:

Col. 6, line 17, change "(P1000)" to --($P_{1000}$)--; line 40, after "curve" insert --94--.

Signed and Sealed this

Third Day of March, 1992

Attest:

HARRY F. MANBECK, JR.

*Attesting Officer*      *Commissioner of Patents and Trademarks*